United States Patent [19]

Catton

[11] Patent Number: 5,135,378
[45] Date of Patent: Aug. 4, 1992

[54] EXTRUDER AND SCREW WITH WEAR SURFACES

[76] Inventor: Larry D. Catton, 702 Wilclif Pl., McPherson, Kans. 67460

[21] Appl. No.: 511,091

[22] Filed: Apr. 19, 1990

[51] Int. Cl.⁵ ............................................ B29C 47/38
[52] U.S. Cl. ..................................... 425/168; 425/208
[58] Field of Search ............... 425/168, 183, 204, 208, 425/376.1; 264/211.23, 36; 241/300; 228/165

[56] References Cited

U.S. PATENT DOCUMENTS

| | | | |
|---|---|---|---|
| 2,268,905 | 1/1942 | Schaub et al. | 62/114 |
| 3,197,814 | 8/1965 | Bond, Jr. et al. | 425/376.1 |
| 3,592,128 | 7/1971 | French | 100/145 |
| 4,091,693 | 5/1978 | Straub | 76/102 |
| 4,223,601 | 9/1980 | Knuth et al. | 228/165 |
| 4,440,076 | 4/1984 | Mansfield | 100/145 |
| 4,949,836 | 8/1990 | Schostek | 29/132 |
| 4,996,919 | 3/1991 | Mansfield | 425/208 |

*Primary Examiner*—Jay H. Woo
*Assistant Examiner*—Robert B. Davis
*Attorney, Agent, or Firm*—Michael Yakimo, Jr.

[57] ABSTRACT

A twin screw extruder includes screw crests having wear surfaces formed of weld bead, deposited on the edges of the crests and into a groove in the crest to form a plurality of spaced dams or fences across the groove between the edges of the crest, and a molybdenum fitting between the dams. The dams or fences prevent unraveling of the entire molybdenum fitting, in the event of separation between the fitting and the screw.

7 Claims, 3 Drawing Sheets

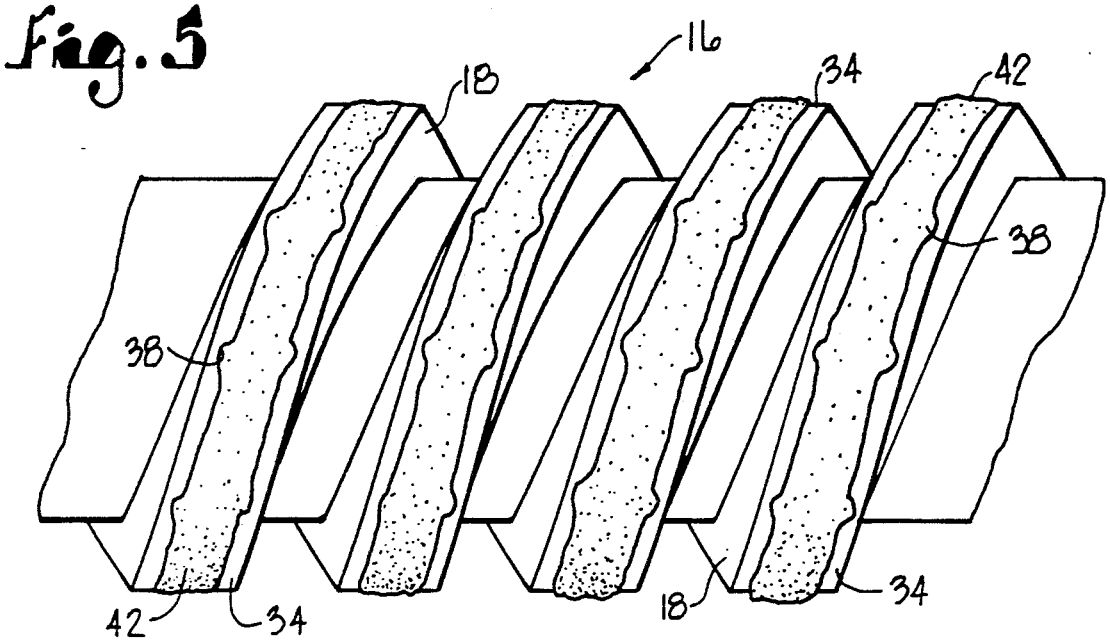
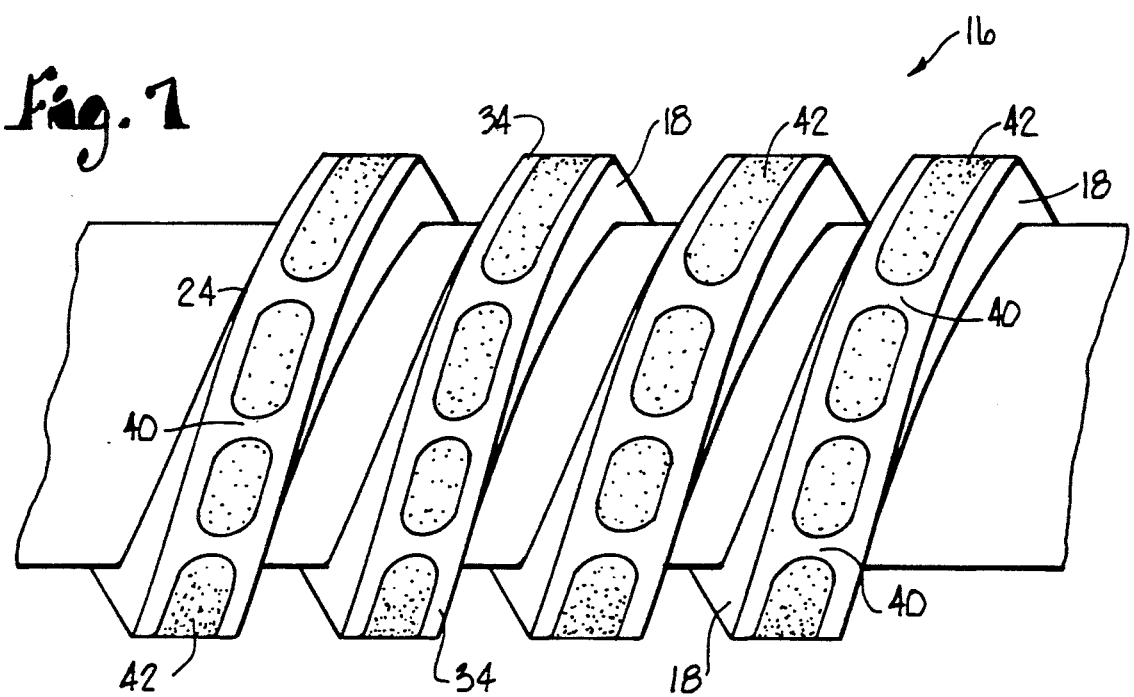

EXTRUDER AND SCREW WITH WEAR SURFACES

BACKGROUND OF THE INVENTION

1. The Field of the Invention

The present invention is directed to extruders. More particularly, the present invention is directed to the wear surfaces of extruder screws.

2. Description of the Related Art

Twin screw extruders typically comprise a barrel having two overlapping bores of equal diameter and mounting hardware for accepting and receiving two extruder screws, which rotate in opposite directions with the threads meshing. The barrel is made from a hard steel. The interior of the bores is typically processed to provide a hard surface. The screws are made of a high grade steel.

The screws must seat tightly against the inner walls of the bores if the extruder is to force the extrusion material through the barrel efficiently. If the screws do not fit tightly into the bores, much of the energy put into the counter-rotating screws churns and mixes the extrusion material and forces it between the sidewall of the bores and the screws. This energy does not move the extrusion material forward. When the gap between the screws and the bores becomes great enough, very little, if any, extrusion material is extruded.

Accordingly, manufacturers generally provide screws that fit tightly into the bores of the barrel, but have contact points of wear material, or bearing surface, that is softer than the barrel, thus permitting a snug fit between the screws and the bores, while insuring that the screws will wear faster than the bore, which is more expensive than the screws.

This problem has been addressed by providing extruder screws having flattened crests on the flights, with a groove cut into the crest, leaving an edge at each side of the thread crest. The outer diameter of these edges is less than the diameter of the bore. A weld bead is laid down on these edges, which are built up to a greater diameter than the bore. Then an even softer material, such as molybdenum, a silvery hard metallic transition element, is molted and sprayed into the groove by an automatic machine until it is built up as high as the weld beads. Next, the wear surfaces, or bearing surfaces, of the extruder screws are machined to the desired diameter, i.e., the diameter of the bores of the barrel, and completed to the desired RMS finish.

Extrusion screws, or screw augers, are frequently 15 or 20 feet (5.7 m-6 m) long and have a thread of some type, whose characteristics may vary from one section of the screw to another, that runs nearly the length of the entire screw.

The bond between the screw and the molybdenum, or other bearing surface, is a mechanical bond. The molybdenum and steel screw are not heated to a high enough temperature to cause fusion bonding. If significant fusion bonding did occur, rebuilding the screw would be much more difficult. In use, the mechanical bond between the bearing surface and the groove in the screw can break. The force of the extrusion materials being forced through the barrel frequently rips off long sections of the bearing surface from the extrusion screws. In this case, the screw no longer fits tightly into the bores and the extruder does not work well, if at all. The extruder must be shut down, the screws removed from it, and replaced with a different set of screws. This process puts the extruder out of service for five to ten hours. Many shops have only one extruder and operate it 24 hours a day. The failed screws must be rebuilt. Such shutdowns are obviously costly. Moreover, they occur prior to the time that normal wear would require a shutdown.

Accordingly, there is a need for an extruder having screws with a bearing surface that cannot be stripped out of the screw in significant lengths if a portion of the bearing surface breaks free of the screw.

SUMMARY OF THE INVENTION

Accordingly, it is a primary object of the present invention to provide an extruder having a bearing surface for extrusion screws that cannot be stripped out of the screw in significant lengths when the mechanical bond between the bearing surface and the screw breaks at one or more points.

This object is achieved by providing an extruder comprising a barrel having at least one bore therein and at least one extruder screw mounted for rotation in the bore. The extruder screw includes a threaded portion having flights with crests. The crests have a groove therein, which creates two edges along the top of each flight. A first bearing material is deposited along the edges to build them up, and the first bearing material is also deposited in the groove and across the space between the edges in a plurality of dams or fences having a width of one-half inch to three inches. These dams are distributed throughout the length of the threaded portion of the screw. The first bearing material may be a weld bead. A second bearing material fills the groove. The second bearing material may be molybdenum. The extruder further includes a means for rotating the screw, and mounting means for holding it in place.

The dams may be rectangular in plan view, having straight leading and following edges, as they appear to a stationary reference point when the screw is rotated. Alternatively, both the leading and trailing edges of the bridges may be rounded.

These bearing materials are deposited in two steps. After the screw is prepared and conditioned for application of a wear surface, the weld bead or other first bearing surface is laid down. Then the molybdenum or other second bearing surface is laid down. Typically, molten molybdenum is sprayed onto the grooves of the screw with an automatic machine. When the metal has cooled, it is machined smooth.

Other objects and advantageous of this invention will become apparent from the following description taken in conjunction with the accompanying drawings, wherein it is set forth by way of illustration and example, an embodiment of this invention.

BRIEF DESCRIPTION OF THE DRAWINGS

FIG. 5 is a front elevation of an extruder screw following application of the second bearing material.

FIG. 7 illustrates an alternative embodiment of the extruder screw.

DETAILED DESCRIPTION OF THE PREFERRED EMBODIMENTS

Figure 1:
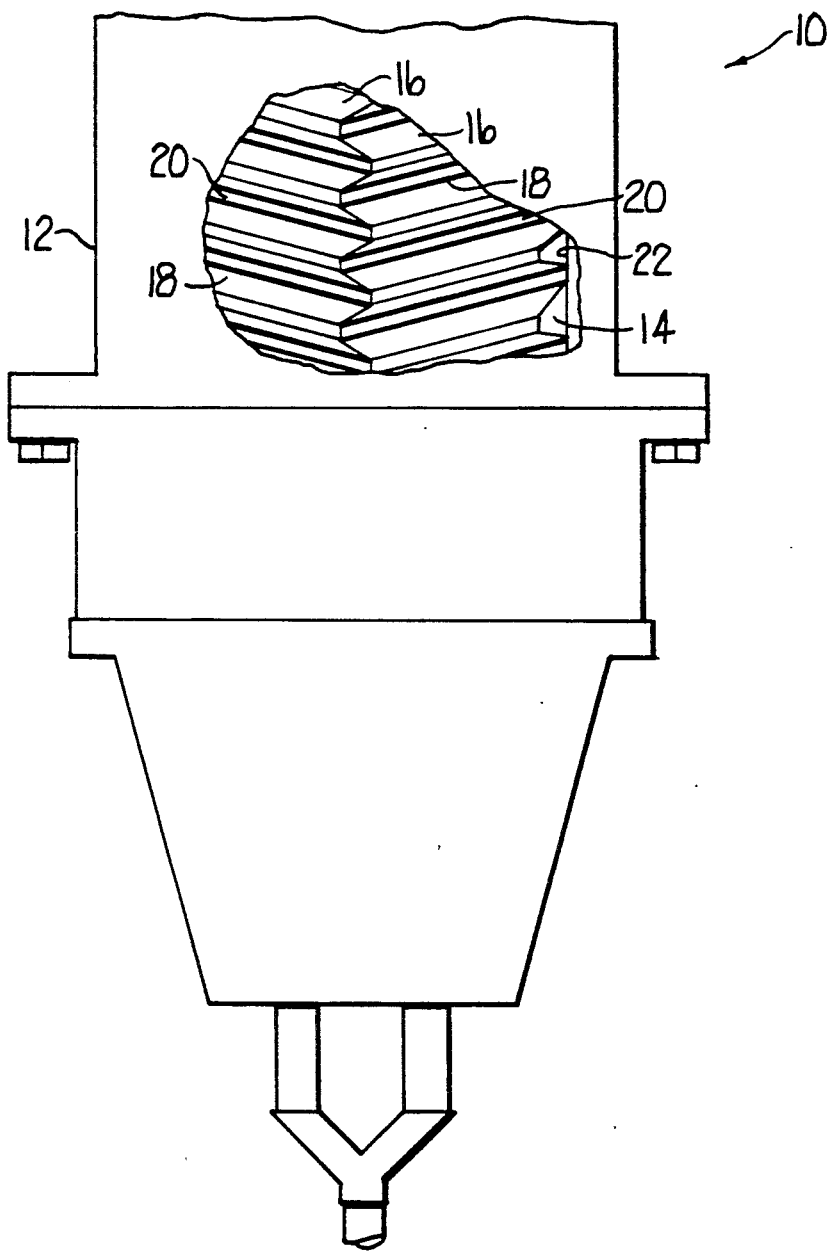
FIG. 1 is a side elevation partially in section of the extruder.

Referring to FIG. 1, there is shown an extruder 10 having a casing or barrel 12 with twin overlapping bores 14 therein, each said bore receiving one screw 16. The extruder disclosed herein is particularly suitable for the extrusion of polyvinylchloride and other plastics. The screws 16 are the same length and have meshing threads, one said screw having a right-hand thread and the second screw having a left-hand thread. In a typical extruder the screws may be from about 8 to 20 feet (2.43–6.1 m) long. The threads, or flights 18 of the screws 16 mesh with each other and rotate in opposite directions. The design of the threads forces the extrusion material toward the front of the extruder, which may be equipped with a mandrel for forming the desired extruded product. The flights 18 include crests 20 at their outer perimeter. The crests 20 bear against the internal side walls of the bores 14.

For the extruder to operate properly, the crests 20 must bear against the side walls firmly. The barrel 12 is typically made of strong steel and the bores are typically processed to provide a very hard, smooth, wearing surface. Because it is more difficult to refurbish worn extruder barrels, the screws 16 are typically equipped with a wear surface of softer material.

Figure 2:
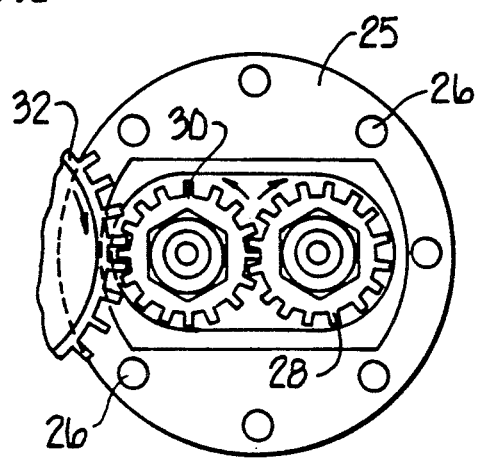
FIG. 2 is an end elevation of the extruder.

Referring to FIG. 2, there is shown the drive end of the extruder, which is covered by an end plate 25 which is held in place by the bolts 26. A pair of meshed gears 28, 30 are driven by the drive gear 32, which meshes with gear 30. The gears 28 and 30 are each fixed to the shaft of an extruder screw 16. The drive gear rotates the extruder screw 16 in opposite directions.

Figure 3:
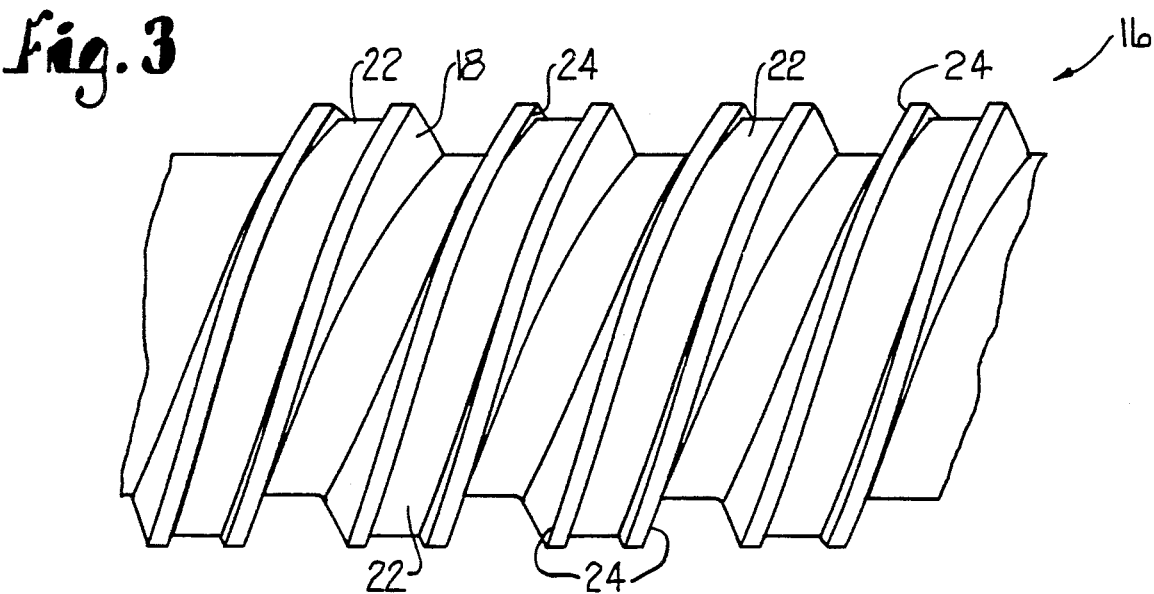
FIG. 3 is a front elevation of an extruder screw prior to application of the wear surfaces.

Referring to FIG. 3, there is shown an elevation of the threaded portion of an extruder screw 16 having flights 18 and crests 20. Each crest 20 has a groove 22 cut into its face, leaving two parallel upright edges 24 that define the groove 22. the groove 22 may be about ⅛ inches (0.3175 cm) deep.

Figure 4:
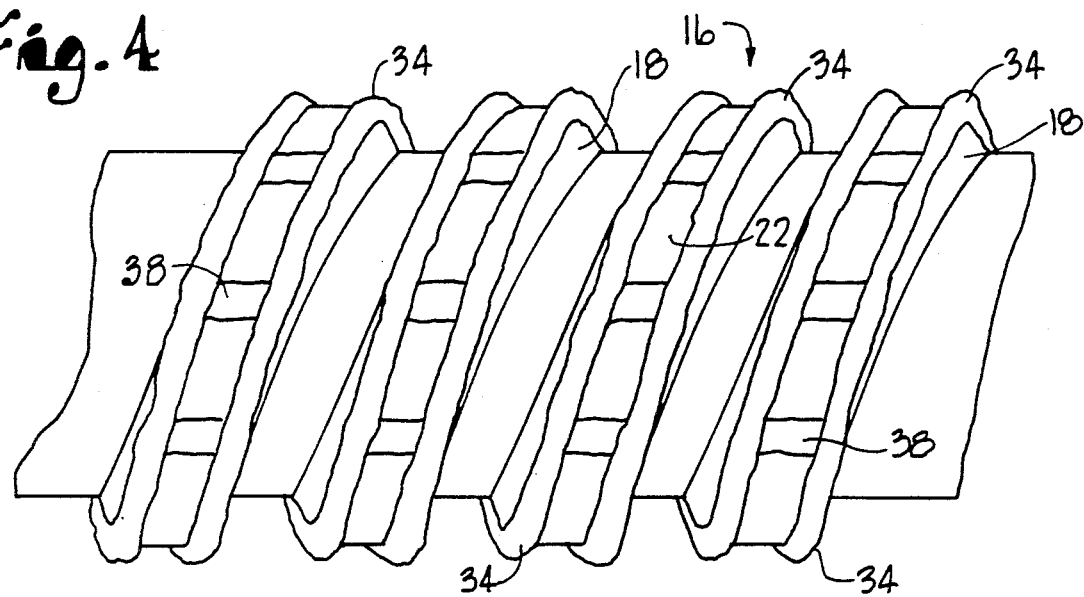
FIG. 4 is a front elevation of an extruder screw following application of a first bearing material.

Referring to FIG. 4, a first bearing material, such as a weld bead 34 is deposited along the edges 24 throughout the length of the threaded portion of the extruder screw 16. As can seen in FIG. 4, the weld bead is not a smooth finished surface. Rather it is built up enough to allow for subsequent machining to make it smooth. In addition to the weld bead on the edges, a weld bead is deposited in the grooves 22 to form the dams or fences 38, which lie across the grooves 22 and perpendicular to the edges 24. The dams 38 are about ⅛ inches high and (0.3175 cm) are formed in spaced locations that are 1–10 inches (2.54–25.4 cm) apart.

Figure 6:
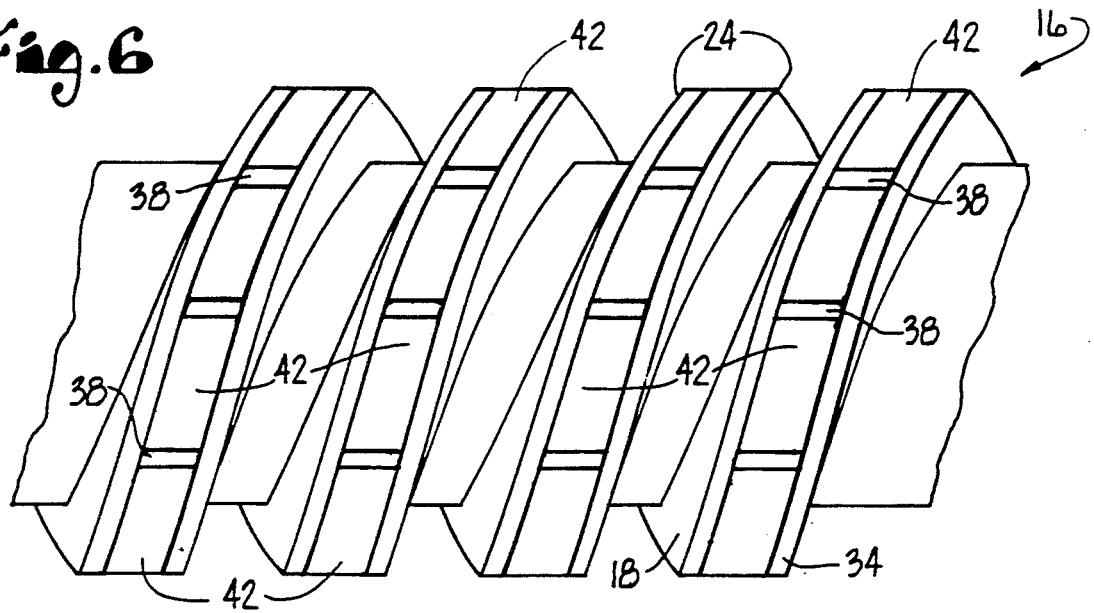
FIG. 6 is an elevation of the extruder screw of FIG. 5 after machining to tolerances.

Referring to FIG. 6, a second bearing material 42 is deposited into the grooves 22 between the dams or fences 38. Typically, the second bearing material is pure molten molybdenum which is sprayed into the groove by an automatic apparatus. The molybdenum 42 or other bearing material 42 forms a mechanical bond with the screw 16. When the screw 16 has cooled, it is machined to provide a smooth wear surface for the particular extruder it will be used with, as shown in FIG. 5. Both the first bearing surface and the second bearing surface are much softer than the bores 14 of the barrel 12.

Referring to FIG. 7, there is shown a finished extruder screw 16 ready for installation in the extruder 10 illustrating a different embodiment of the extruder. In this embodiment, the dams or fences 40 run perpendicular to the edges 24, but are arcuate so that the end of each section of the second bearing material is rounded.

The arcuate ends of the molybdenum bearing section 42 may be semicircular; elliptical, etc. In the preferred embodiment disclosed herein, they are segments of a circle. This design decreases the likelihood that a protruding edge of the molybdenum wear surface 42 will break loose from the groove 22 during operation of the extruder. The dams 40 are spaced apart in the same manner as the dams 38.

If one of the second wear surface sections, i.e., molybdenum surface 42, should break loose during operation, the extruder 10 will loose some efficiency, but it cannot cause the entire bead of molybdenum to be stripped away from the screw 16.

The wear surfaces, i.e., the bearing surfaces, of the extruder and the process disclosed herein for forming them can be used in the manufacture of new extruders or in rebuilding or reconditioning used extruder screws or augers. The surface of the screw, and in particular the surface of the crests 20 and the grooves 12 and edges 24 of the grooves 12 must be conditioned prior to deposition of the bearing surfaces. These screw surfaces must be clean and free from dirt and grease and of appropriate coarseness to insure a proper bond between the screw surfaces and the deposited bearing surfaces.

While certain forms of this invention have been illustrated and described herein, the invention is not limited thereto, except insofar as such limitations are included in the following claims.

What is claimed as new and described to be protected by Letters Patent is as follows:

1. For use in an extruder apparatus, an extruder screw having a raised helical thread along the extent of said screw, the improvement comprising:
    a groove along the helical extent of said thread, said groove presenting first and second spaced-apart edges;
    a first deposit of a bearing material, said first deposit being fusion-bonded along said spaced-apart edges;
    a plurality of spaced-apart second deposits of a bearing material, said second deposits being fusion bonded across said groove and between said first and second edges to form a plurality of spaced-apart fusion bonded dams extending across said groove;
    a third deposit of a bearing material, said third deposit being mechanically bonded along said groove, said spaced-apart dams interrupting said third deposit along said groove to present a plurality of mechanically bonded segments along said groove, whereby to confine any subsequent separation of a portion of said third deposit from said groove to a mechanically bonded segment between a pair of said spaced-apart dams containing said portion.

2. An extruder screw in accordance with claim 1 wherein said first and said second deposits of bearing materials are the same material.

3. An extruder screw in accordance with claim 1 wherein said first deposit of bearing material is a weld bead.

4. An extruder screw in accordance with claim 1 wherein said second deposit of bearing material is a weld bead.

5. An extruder screw in accordance with claim 4 wherein said third deposit material is molybdenum.

6. An extruder screw in accordance with claim 1 wherein said dams transverse said groove and are perpendicular to said edges.

7. An extruder screw in accordance with claim 6 wherein each dam presents a pair of spaced-apart arcuate edges.

* * * * *

UNITED STATES PATENT AND TRADEMARK OFFICE
CERTIFICATE OF CORRECTION

PATENT NO. : 5,135,378

DATED : August 4, 1992

INVENTOR(S) : Larry D. Catton

It is certified that error appears in the above-identified patent and that said Letters Patent is hereby corrected as shown below:

Column 2, line 50, delete "advantageous" and substitute --advantages--.

Column 3, line 39, in the phrase "the groove 22 may be about" delete "the" and substitute --The--.

Column 3, line 44, in the phrase "As can seen in Fig. 4," after the word "can" insert the word --be--.

Column 4, line 11, delete the word "loose" and substitute --lose--.

Column 4, lines 18 and 19, delete both occurrences of the number "12" and substitute --22--.

Signed and Sealed this

Tenth Day of August, 1993

Attest:

MICHAEL K. KIRK

Attesting Officer

Acting Commissioner of Patents and Trademarks